United States Patent [19]
Ford et al.

[11] Patent Number: 4,853,940
[45] Date of Patent: Aug. 1, 1989

[54] LASER CATHODE COMPOSED OF EMBEDDED LASER GAS MOLECULES

[75] Inventors: Carol M. Ford, Columbia Heights; Theodore J. Podgorski, Maplewood, both of Minn.

[73] Assignee: Honeywell Inc., Minneapolis, Minn.

[21] Appl. No.: 292,273

[22] Filed: Dec. 30, 1988

[51] Int. Cl.$^4$ .............................................. H01S 3/097
[52] U.S. Cl. ........................................ 372/87; 372/69
[58] Field of Search ................................... 372/87, 69

Primary Examiner—Leon Scott, Jr.
Attorney, Agent, or Firm—Robert A. Pajak

[57] ABSTRACT

Disclosed is a long life cathode for laser generators consisting of a cathode body having an electron emitting surface in which lasing gas molecules are embedded therein.

16 Claims, 1 Drawing Sheet

LASER CATHODE COMPOSED OF EMBEDDED LASER GAS MOLECULES

BACKGROUND OF THE INVENTION

The present invention relates generally to gas discharge devices, and more particularly to the cathode construction found in such devices.

A laser typically employs an unheated or cold cathode which is secured to a laser body or housing as a source of electron emission for laser operation. The body of the laser may be composed of glass or glass like materials, generally having low coefficients of thermal expansion. The cathode may be composed of a metal or metal-alloy material, for example aluminum, well known in the art. The cathode is generally secured to the laser body by a gas tight seal, and is adapted to be connected to a negative electric potential source.

In gas lasers having a limited gas supply, cathode sputtering is one of the major causes of shortened laser life. In a helium-neon gas laser, positively charged gas ions of the plasma are attracted to the negatively charged cathode, and release negatively charged electrons. Unfortunately, the positively charged ions can dislodge cathode material molecules from the active electron emitting surface of the cathode. This phenomenon is usually referred to as cathode sputtering. For gas laser applications, cathode sputtering results in decreased laser life. As a result of cathode sputtering, the dislodged cathode material can, in turn, trap or bury lasing gas molecules into the active emitting surface walls of the cathode. If the supply of gas is limited, the gas molecule burying action, caused by sputtering, can eventually reduce the available gas ions to the point that lasing action ceases.

Metallic cathodes, particularly aluminum cathodes, have been widely used in the art for gas lasers. An aluminum cathode generally has the cathode emitting surface coated with a thin layer of oxide to prevent cathode sputtering. During the cathode manufacturing process, a layer of oxide is formed naturally by exposing a cleaned aluminum cathode emitting surface to an oxygen plasma with the aluminum cathode connected as the cathode in an electrical circuit. A thin layer of oxide is formed on the aluminum electron emitting surface due to the pressure of oxygen and oxygen ions hitting the cathode surface.

Aluminum cathodes having the oxide layer have improved laser life above that of uncoated aluminum due to increasing the resistance to sputtering. This is so since the oxide layer is generally harder than the aluminum. Nevertheless, irregularities in the emitting surface of the cathode can result in localized ion flow which in time breaks down the oxide layer, and begins localized sputtering of the cathode resulting in extinction of the laser.

Further, in some laser applications, it is desirable that the cathode have a very low thermal coefficient of expansion so that it can be secured to a laser body or block which has a very low coefficient of thermal expansion. A body of a laser comprised of quartz like products such as Zerdur and Cervit has a very low coefficient of thermal expansion. In these circumstances, it is highly desirable that the coefficient of thermal expansion of the cathode be as low as possible and preferably match the coefficient of thermal expansion of the laser body.

SUMMARY OF THE INVENTION

It is an object of the present invention to provide a cathode which enhances laser life.

It is another object of the invention to provide a cathode which is resistant to the deleterious effects of cathode sputtering caused by the lasing gas plasma within an active gas laser.

These and other objects of the invention are realized in accordance with the present invention in the employment of a cathode comprising an electron emitting surface with lasing gas molecules embedded therein.

BRIEF DESCRIPTION OF THE INVENTION

Figure 1:
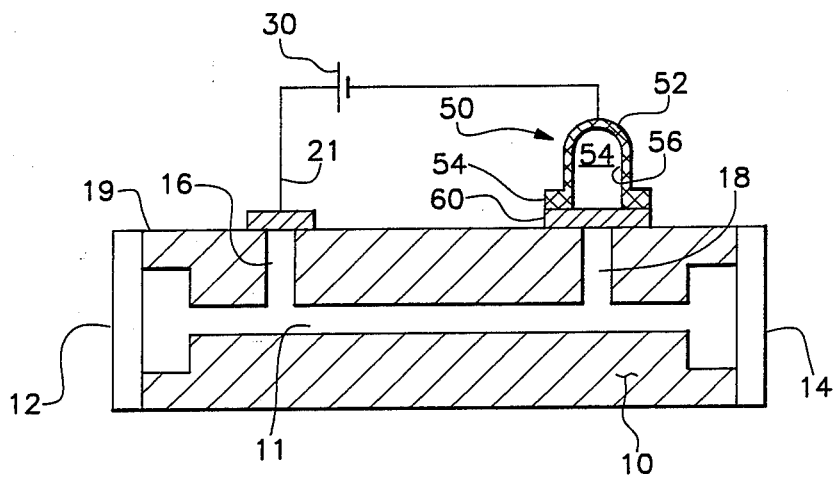
FIG. 1 is a schematic diagram of a gas laser.

FIG. 1 illustrates a cathode commonly used for a wide variety of gas lasers. The laser is generally comprised of a body 10 having a cavity 11 containing a gas or gas mixture such as helium and neon. Fixed to the laser body are mirrors 12 and 14 for establishing a laser path therebetween.

In communication with cavity 11 are passageways 16 and 18, both extending between the surface 19 of body 10 and cavity 11.

Covering passageway 16 at surface 19 is a first electrode 21 utilized as an anode. Anode 21 is adapted to be electrically connected to the positive side of electric potential source 30. Anode 21 is secured to body 10 by a gas tight seal, e.g., an indium seal (not shown), in a well known manner. Anode 21 is intended to be in communication with passageway 16 to provide an electrical discharge path through the gas.

Similarly, a second electrode 50 covers passageway 18 at surface 19 and is utilized as a cathode. Cathode 50 is adapted to be electrically connected to the negative side of source 30. Cathode 50 is intended to be in communication with passageway 18 to also provide an electrical discharge path through the gas.

Figure 2:
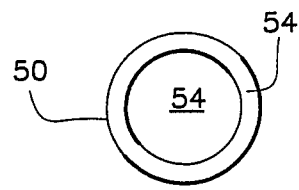
FIG. 2 is a bottom view of the cathode illustrated in FIG. 1.

As is generally illustrated in FIGS. 1 and 2, cathode 50 is comprised of a body 52 having a cavity 54 with a electron emitting surface 56. Cathode 50 may be fixed to laser body 10 by an indium seal 60, or by any other appropriate manner. Cathode 50 is fixed to laser body 10 such that the electron emitting surface 56 may be in communication with the lasing gas contained by laser body 10.

Cathode 50 is generally constructed of a metal or metal alloy such as aluminum, beryllium, invar, and the like, or ceramics such as silicon carbide, boron carbide, or boron nitride. Cathodes 50 may be constructed using both ceramic and sintering processes. Particularly, cathodes constructed of a monolithic body of oxidized metallic particles provide high resistance to sputtering. However, even this variety of cathode construction will benefit from the present invention as will be subsequently described.

Figure 3:
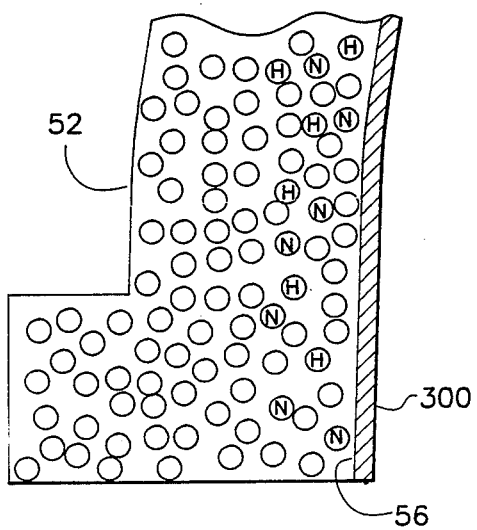
FIG. 3 is a microscopic view of the wall of the cathode in accordance with the present invention.

In the present invention, as particularly illustrated in FIG. 3, cathode 50 includes a cathode emitting surface 56 having molecules of a lasing gas embedded therein. For illustrative purposes, the lasing gas molecules are illustrated in FIG. 3 by the circles having the letter H and N representing Helium and Neon gas molecules.

The unlabeled circles representing molecules or atoms of the cathode body material. The unlabeled circles may also represent oxidized metallic particles or ceramic particles of monolithic cathode body.

Also illustrated in FIG. 3 is an oxide film 300 at surface 56. This film may also be provided and function in a manner well known in the art for reducing sputtering effects and enhancing laser life.

In the preferred embodiment of the invention, it is intended that the cathode emitting surface be saturated with the lasing gas molecules, although the saturation level is not necessarily required. The depth of penetration of the gas molecules into the cathode body 52 at emitting surface 56 is substantially dependent upon the technique employed in embedding the gas molecules into the cathode body.

In operation, a cathode constructed in a manner as described above will still sputter. However, since the cathode emitting surface has been saturated with a lasing gas molecule, then the sputtering action will behave such that there exists an exchange between a lasing gas molecule from the lasing gas cavity with an "embedded" gas molecule in the cathode. That is, the bombardment of the cathode emitting surface by a gas ion will tend to release a buried lasing gas molecule. Sputtering occurs trapping one of the free gas ions into the cathode. Thus, there exists an equilibrium between those lasing gas molecules from the lasing gas cavity which are buried into the cathode emitting surface, and those buried gas molecules released from the cathode emitting surface. Thus, any sputtering action will not cause any reduction in the available gas molecules for providing lasing action.

Saturation of the cathode emitting surface with lasing gas molecules may be accomplished by a variety of techniques. One technique is the employment of the cathode in a "run-in" gas discharge chamber filled with the lasing gas of "the" laser generator on which the cathode is intended to be employed. An electrode is electrically operated as a cathode in a gas discharge circuit. For example, if the cathode is intended to be used with an argon gas laser, the chamber would be filled with argon gas. Likewise, if the cathode is intended to be used with a helium-neon laser, then the chamber would be filled with helium neon gas.

In the run-in chamber, the cathode would be subjected to the gas discharge current to create the usual plasma associated with lasers. After a sufficient amount of time, sputtering action will take place and the gas molecules will be embedded into the cathode's electron emitting surface. Further, the chamber can also be heated to enhance diffusion into the surface and/or alternatively higher operating currents can be used. It should be also noted that simple heating may need only be used as opposed to operation of the cathode as a gas discharge device in the run-in chamber.

Alternatively, the lasing gas molecules can be ion implanted into the desired electron emitting surface using ion beam guns similar to those used in integrated circuit fabrication.

It should be recognized by those skilled in the art that cathodes may be constructed of a monolithic body consisting essentially of an agglomeration of oxidized metallic particles by use of a sintering process. In accordance with the present invention the sintering process may also include the lasing gas molecules. Thus, the gas molecules can be trapped in the material matrix of the sintered cathode material during the sintering process.

It should also be noted that lasing gas mixtures such as helium-neon do result in more or less preference for burying of one or the other of the gas mixture elements. Thus, it may be desirable to bury only one of the lasing gas elements of a lasing gas mixture. For example, it may be desirable to saturate the cathode emitting surface with neon gas molecules for a helium-neon gas laser application since neon is preferentially buried during sputtering.

Various modifications of the invention may be made without departing from the true spirit and scope of the present invention, and it is to be understood that the invention is intended to be limited only as defined in the following claims. More specifically, the cathode in accordance with the present invention may be employed by a wide variety of lasers, including ring lasers and multi-frequency ring lasers.

The embodiments of an invention in which an exclusive property or right is claimed are defined as follows:

1. A cathode for a laser generator employing a selected lasing gas, said cathode being comprised of a body having an active surface in communication with said lasing gas, said active surface of said cathode is embedded with molecules of at least one selected element of said lasing gas.

2. The cathode of claim 1 wherein said cathode body is composed of oxidized metallic particles which have been agglomerated together by a sintering process in the presence of at least one selected element said lasing gas.

3. The cathode of claim 2 in which said oxidized metallic particles are composed substantially of beryllium.

4. The cathode of claim 2 in which said oxidized metallic particles are composed substantially of aluminum.

5. The cathode of claim 1 wherein said gas is a selected mixture of helium and neon.

6. The cathode of claim 1 wherein said emitting surface further includes a thin oxide layer.

7. The cathode of claim 1 wherein said cathode body is comprised of a ceramic material.

8. An electrode for a laser generator employing a selected lasing gas, said electrode being comprised of a body having an active surface for being in communication with said lasing gas, said active surface of said electrode is embedded with molecules of at least one selected element of said lasing gas.

9. The electrode of claim 8 wherein said cathode body is composed of oxidized metallic particles which have been agglomerated together by a sintering process in the presence of at least one selected element of said lasing gas.

10. The electrode of claim 9 in which said oxidized metallic particles are composed substantially of beryllium.

11. The electrode of claim 9 in which said oxidized metallic particles are composed substantially of aluminum.

12. The electrode of claim 8 wherein said lasing gas is a selected mixture of helium and neon.

13. The electrode of claim 8 wherein said emitting surface further includes a thin oxide layer.

14. The electrode of claim 8 wherein said cathode body is comprised of a ceramic material.

15. A laser generator comprising:
a body for containing a lasing gas;
an electric potential source;

an electrode secured to said body and providing a gas tight seal, said electrode being electrically connected to the negative side of said source, said electrode having an active surface in communication with said gas; and said electrode is substantially composed of a body in which said active surface is embedded with molecules of at least one element of said lasing gas.

16. A method of making an electrode for a laser generator utilizing a selected lasing gas, the method comprising the steps of:

first embedding molecules of at least one element of said lasing gas into a selected surface of said electrode; and then fixing said electrode to said laser generator such that said selected surface is in communication with said lasing gas.

* * * * *

UNITED STATES PATENT AND TRADEMARK OFFICE
CERTIFICATE OF CORRECTION

PATENT NO. : 4,853,940

DATED : August 1, 1989

INVENTOR(S) : Carol M. Ford and Theodore J. Podgorski

It is certified that error appears in the above-identified patent and that said Letters Patent is hereby corrected as shown below:

Column 4, line 37, after "said" insert --lasing--.

Signed and Sealed this

Tenth Day of July, 1990

Attest:

HARRY F. MANBECK, JR.

*Attesting Officer*    *Commissioner of Patents and Trademarks*